No. 807,254. PATENTED DEC. 12, 1905.
J. EVANS.
CLUTCH MECHANISM FOR COUPLING ROTATABLE PARTS.
APPLICATION FILED DEC. 16, 1903.

3 SHEETS—SHEET 1.

Witnesses.
Geo. Fury
Harry Davis

Inventor.
Joseph Evans.

No. 807,254. PATENTED DEC. 12, 1905.
J. EVANS.
CLUTCH MECHANISM FOR COUPLING ROTATABLE PARTS.
APPLICATION FILED DEC. 16, 1903.

3 SHEETS—SHEET 2.

Witnesses
Geo Fuchs
Harry Davis

Inventor
Joseph Evans

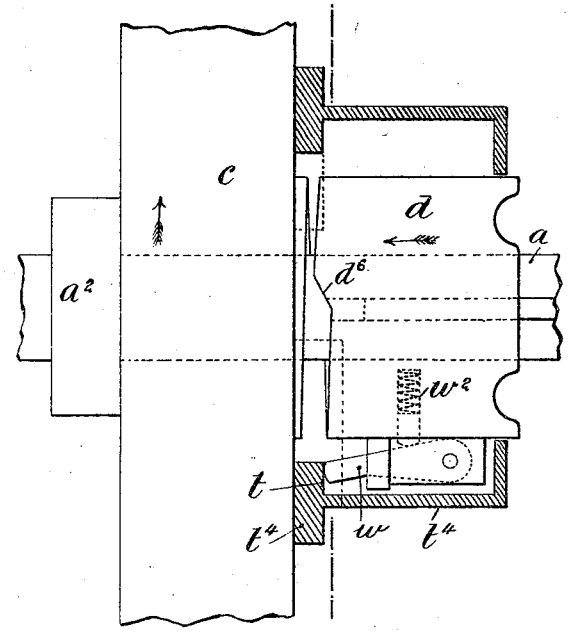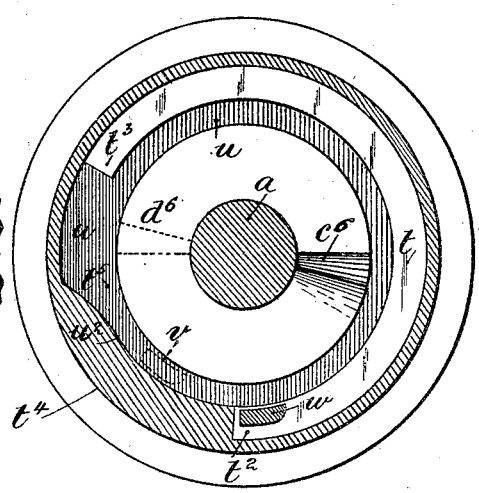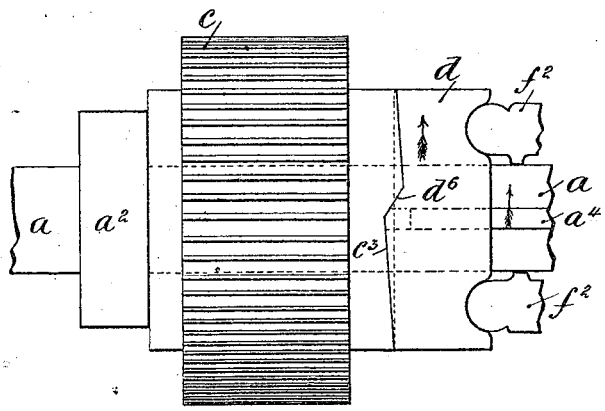

UNITED STATES PATENT OFFICE.

JOSEPH EVANS, OF BIRMINGHAM, ENGLAND.

CLUTCH MECHANISM FOR COUPLING ROTATABLE PARTS.

No. 807,254.      Specification of Letters Patent.      Patented Dec. 12, 1905.

Application filed December 16, 1903. Serial No. 185,437.

*To all whom it may concern:*

Be it known that I, JOSEPH EVANS, engineer, a subject of the King of Great Britain, residing at "Eastfield," Gravelly Hill North, Birmingham, in the county of Warwick, England, have invented certain new and useful Improved Clutch Mechanism for Coupling Rotatable Parts, of which the following is a specification.

This invention is characterized by the hereinafter-described improved clutch mechanism for coupling rotatable parts, such being particularly useful as part of the driving mechanism of geared power-presses and other heavy machinery requiring to be frequently put into and out of action at high speeds.

By the aid of the accompanying sheets of drawings and the description hereinafter appearing the clutch mechanism according to the invention will be well understood.

Figure 1:
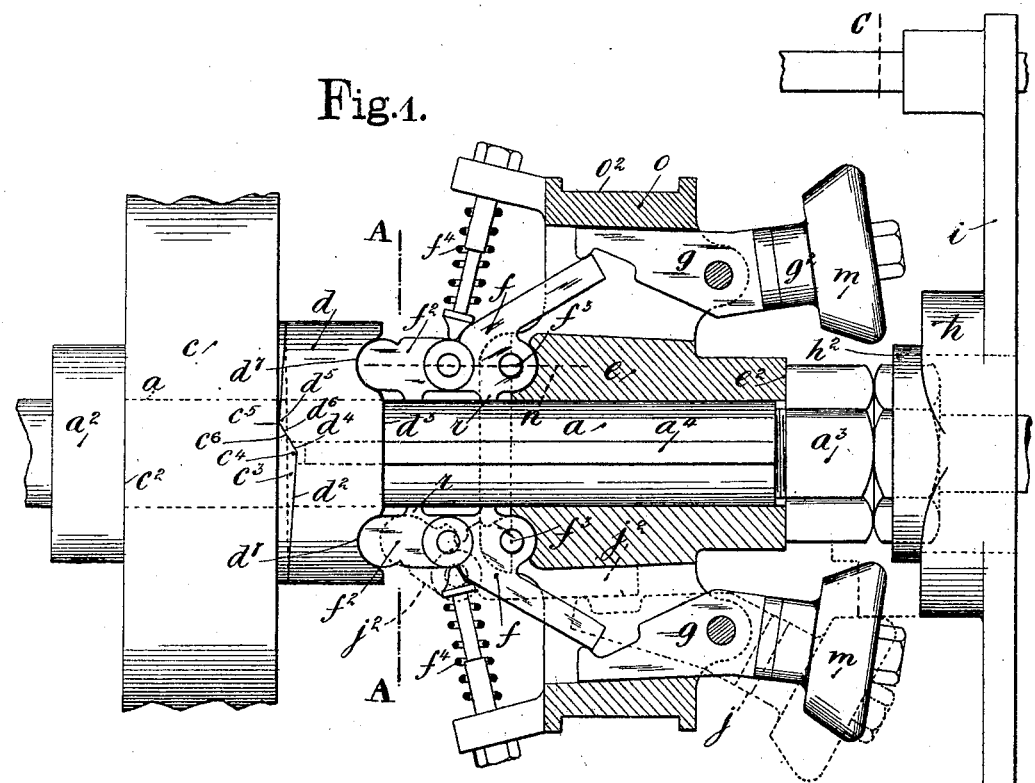
Figure 2:
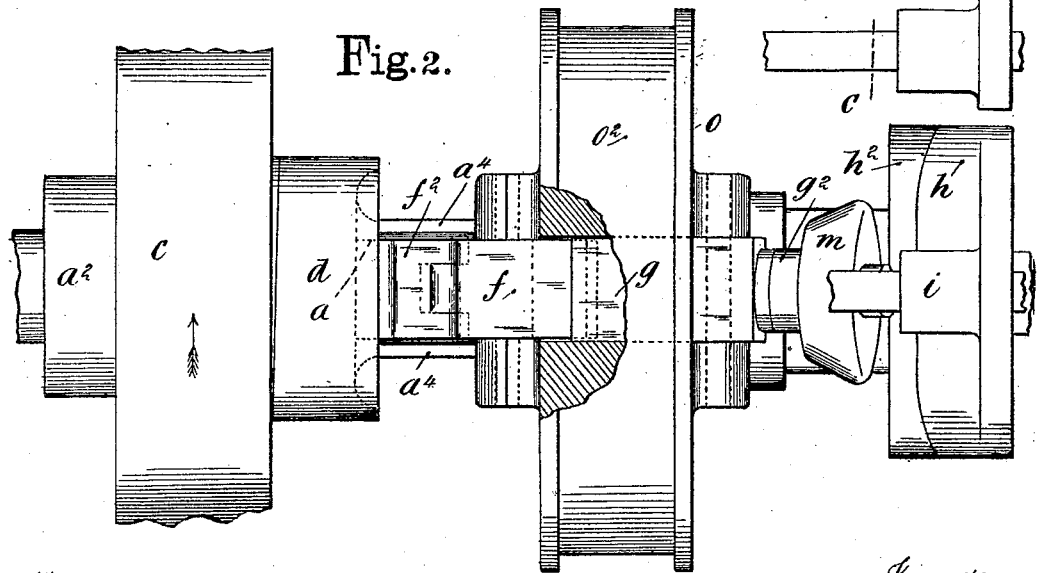
Figure 4:
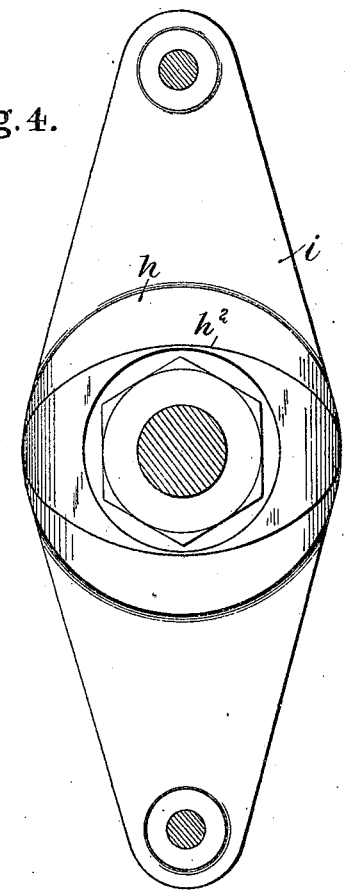
Figure 5:
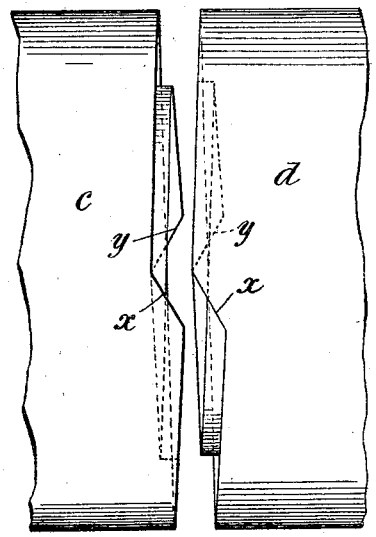
Figure 8:
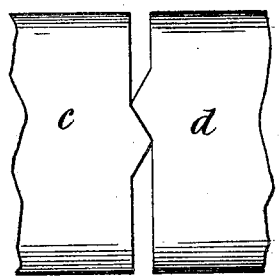
Figure 3:
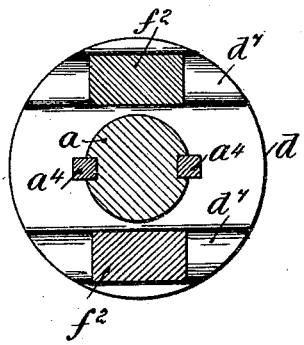
Figure 9:
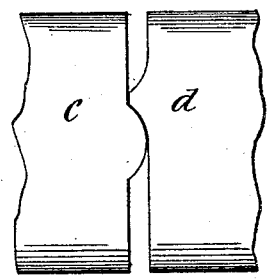

In Figure 1 is represented a sectional elevation of the mechanism as viewed longitudinally, while in Fig. 2 a plan of Fig. 1 in sectional elevation is represented. Fig. 3 is a transverse section of Fig. 1 on the dotted lines A A, and Fig. 4 a transverse section of Fig. 1 on the dotted lines C C. Fig. 5 shows a detail representation of one of the parts of the clutch mechanism, and Figs. 6 and 7 longitudinal and side sectional elevations of another part of the clutch mechanism, this other part being shown separate of Figs. 1 and 2 for easy representation. Figs. 8 and 9 show separately detail modifications of one part of the clutch mechanism, and Fig. 10 shows a rearrangement of some of the parts Figs. 1 and 2.

In Figs. 1 to 4, $a$ is a rotatable shaft upon which the whole of the clutch mechanism is arranged, this shaft carrying upon it axial abutments $a^2$ $a^3$. The abutment $a^3$ is preferably an adjustable one as represented, comprising two nuts screwing upon the shaft and locking each other thereon in any adjusted position. The abutments are thrust-abutments. Arranged to freely rotate upon the shaft $a$, with its end $c^2$ working hard against the abutment $a^2$, is a sleeve $c$, whose other end $c^3$ is formed with an approximately V-shaped axially-arranged projection $c^4$ and notch $c^5$, this projection and notch providing on the end $c^3$ an interlocking driving-incline $c^6$ at an angle of about sixty degrees with the shaft's axis. More than one of such driving-inclines may be provided upon the end $c^3$ of the sleeve. An axially-slidable collar $d$ is fitted upon the shaft $a$ to rotate at all times with it and to engage and disengage the end $c^3$ of the sleeve $c$, the said collar having its end or side $d^2$ formed with counterparts of the projections $c^4$, the notch $c^5$, and the interlocking driving-incline $c^6$, these counterparts being, respectively, lettered $d^4$ $d^5$ $d^6$. The collar $d$ rotates with the shaft by the key $a^4$, but it can slide axially on the shaft.

Assuming the sleeve $c$ is the driving element of the mechanism and the shaft $a$ the driven element, in order to drive the said shaft from the sleeve the collar $d$ must be held in close inseparable engagement with the driving-incline of the sleeve, the natural action of the rotating sleeve being to force the said collar away from it along the shaft $a$ toward the axial abutment $a^3$.

To hold the collar $d$ in close driving engagement with the sleeve $c$, a means is employed between the end or side $d^3$ of the collar $d$ and the abutment $a^3$ to constitute a removable rigid link or coupling-piece between the said collar and abutment, this link or piece when in action bearing in a line parallel with the axis of the shaft $a$ part of the driving strain between the driving and driven parts due to the natural tendency of the sleeve $c$ to force the collar $d$ away from it toward the abutment $a^3$.

The link or piece as aforesaid comprises the following parts: A carrier-sleeve $e$ is provided upon the shaft $a$ between the collar $d$ and the abutment $a^3$ to carry two bell-crank levers $f f$ and means for rocking them, this carrier-sleeve rotating at all times with the shaft $a$ and abutting at its end $e^2$ hard against the abutment $a^3$. Each lever $f$ has pivotally connected to it a short block $f^2$, whose one end works against the end $d^3$ of the sliding collar $d$, the said one end of the block engaging a gap or recess $d^7$ in the said collar's end. The fulcrum of each lever $f$ is in the carrier-sleeve at $f^3$. A spring $f^4$, carried by the carrier-sleeve $e$, is applied to the lever at a point where the block $f^2$ is pivotally connected to it. The one arm of each lever $f$ is engaged by one of the arms of a second lever $g$, which is fulcrumed upon the carrier-sleeve $e$, to be operated upon by the lever $f$ and from a collar $h$, which is moved by the frame $i$ to rock the said second lever into the position as represented at $j$ by the dotted lines, the end $g^2$ of the second lever in this dotted position resting upon the periphery of the collar $h$, which is concentric with the shaft $a$. The end $g^2$ of the second lever is provided with a roller-contact $m$ for the collar $h$. A cam-lead $h^2$ is provided on the collar $h$ to lift the end $g^2$ of the second lever onto the cylindrical periphery of the collar, this lead being clearly represented in Fig. 4. The collar $h$ does not rotate, but slides in the direction of the axis of the shaft $a$. The dotted line $n$, Fig. 1, shows clearly how the fulcrum of the lever $f$ and the pivoting of the block $f^2$ to the said lever is arranged, so that when the said lever and block are in action (forming with the carrier-sleeve $e$ a rigid link or coupling-piece between the abutment $a^3$ and the sliding collar $d$) those parts of them bearing the strain due to the thrust from the driving-inclines are in a line parallel to the axis of the shaft $a$. The positions of the lever $f$ and block $f^2$ at the time the collar $d$ is out of engagement with the driving-sleeve $c$ is indicated in Fig. 1 by the dotted lines $j^2$. The levers $f$ and the blocks $f^2$ have upon them projections $r$, which when the said levers and blocks have been straightened out to form rigid links or coupling-pieces come against the shaft $a$ to stop the movement of the said levers and blocks after they have been forced into proper parallel line with the shaft's axis.

The carrier-sleeve $e$ is in the arrangement of the invention shown in Figs. 1 to 4 formed with an annulus $o$, which is in one piece with it, this annulus to provide a surface $o^2$, against which friction can in a suitable way be created for the purpose of at once stopping the rotation of the driven part of the mechanism after the clutch has been thrown out of action, the provision of this providing a brake which, if the clutch is used for heavy machinery requiring quick and frequent stopping and starting, (for which it is particularly adaptable,) is of considerable importance. The breaking friction may be created on the drum by brake-blocks, convolutions of wire, or other suitable means.

In the arrangement of the invention, Fig. 10, the shaft $a$ is the driving part and the sleeve $c$ the driven part, this driven part being shown as a gear-wheel. The shaft $a$ in this case drives the slidable collar $d$, whose driving-incline $d^6$ when it engages in an inseparable manner the end $c^3$ of the sleeve $c$ acts upon the counterpart incline upon the said end and carries round the sleeve $c$.

The drawings and the description aforesaid set forth a very desirable method of providing between the abutment $a^3$ and the slidable collar $d$ removable links or coupling-pieces; but it will be readily understood that the same may be provided in various ways, all of which are within the scope of the present invention.

The driving-inclines between the sleeves $c$ and the slidable collar $d$ may have various formations, as will be seen from the diagrams, Figs. 5, 8, and 9, all, however, giving the desired axial thrusts of the collar and sleeve against the abutments $a^2 a^3$, and it is here desired to point out that this thrust forms a considerable portion of the driving strain necessary for the driving part of the mechanism to adequately pick up the load to be driven, in this way taking a large amount of the driving strain off the keys $a^4 a^4$.

In Fig. 5 a modification of the sleeve $c$ and slidable collar $d$ is shown. In this particular it will be stated that a pair of driving-inclines is formed upon the sleeve $c$ and the collar $d$ in lieu of a single driving-incline, as shown in Fig. 1. In the modification in Fig. 5 one pair of driving-inclines is inward of the other— that is to say, nearer the center than the other pair—and the inner driving-inclines are designated by the reference characters $x\ x$, and the outer driving-inclines are designated by the reference characters $y\ y$.

In a clutch mechanism aforesaid it is necessary for the proper operation that the driving-inclines on the sleeve $c$ and collar $d$ be put into full and complete engagement at once—i. e., that the said collar and sleeve shall be forced together fully home before the driving-inclines contact—and this is accomplished in the following manner by the control of the working of the removable rigid link or coupling-piece between the collar $d$ and the abutment $a^3$. This control will be described with reference to Figs. 6 and 7. Normally the tendency of the sleeve $c$ and collar $d$ is to engage, by the action of springs or other devices, (such as are represented in Figs. 1 and 2,) the said springs, however, being normally held out of action when the rollers $m$, Figs. 1 and 2, are upon the collar $h$. The slidable collar $d$ carries upon it a movable stop piece or finger $w$, which works against a stop-surface $t$, provided rigidly upon the rotatable sleeve $c$, this stop-surface being a ring-like one concentric with the shaft $a$ for about two-thirds of its (the stop-surface's) diameter. In Fig. 7 the stop-surface is represented by $t^2\ t\ t^3$. Between the points $t^3\ t^2$ of the stop-surface are provided a gap or sinking $u$ and a cam-piece $u^2$, these being carried by the piece $t^4$, upon which the said stop-surface is formed. The stop piece or finger $w$ is spring-operated at $w^2$ into the position it is represented in in Fig. 6 and in full lines in Fig. 7, and so long as it contacts the stop-surface $t$ (the ring-like surface formed of $t^2\ t\ t^3$) the slidable collar $d$ cannot be forced into engagement with the sleeve $c$, the said engagement being only possible while the stop-piece $w$ is opposite the gap or recess $u$, which is extended inwardly into a ring-like cut-away part of the same depth as the gap $u$. The dotted lines, Fig. 6, show where the said section, Fig. 7, is taken. The aforesaid is a governing means for the engagement of the clutch and works as follows: The sleeve $c$ is continually rotating, while the collar $d$ is normally stationary, the springs or other means for forcing the said collar $d$ in the direction of the arrow being held out of action. Now immediately the springs exert a force on the collar $d$ to slide it on the shaft in the direction of the arrow there is an automatic effort of the clutch to engage; but its engagement is not possible until the stop-piece $w$ comes opposite the gap $u$, when instantly the collar $d$ moves quite close to the sleeve $c$, the driving-inclines $c^6$ $d^6$ being at the moment farthest away from each other in a driving sense, so that when the said inclines touch for driving they are always fully in engagement. The cam-piece $w^2$ operates upon the movable stop-piece $w$ to move it into the position represented at $v$ in dotted lines, so that the period of time for engagement of the clutch is from the point $t^3$ (in the direction of the point $t^5$) to the point $t^2$, the stop-piece $w$ by the spring $w^2$ moving back onto the stop-surface $t$ immediately it is clear of the cam-piece $w^2$.

Having now described my invention, what I claim, and desire to secure by Letters Patent, is—

1. In a clutch mechanism, the combination with a pair of rotatable members provided with driving-inclines adapted to abut, causing thereby the rotation of said members in unison, of a coupling device for said members, said device consisting of a sleeve, bell-crank levers carried thereby, a block pivotally connected to each of said bell-cranks and adapted to engage in one of said members for shifting the same, thereby causing the abutting of said inclines, and a pair of levers for shifting said bell-crank levers to operative position, causing thereby the engagement of the blocks in one of said members.

2. In a clutch mechanism, the combination with a pair of rotatable members having the opposing ends thereof provided with interlocking driving-inclines, one of said members being shiftable, of a coupling device for said members, said device consisting of a sleeve, lever mechanisms carried thereby and adapted when operated to actuate said shiftable member, causing thereby the interlocking of the inclines and the rotating of said members in unison, and means for actuating one of said lever mechanisms, causing thereby the operation of the other of said mechanisms and the actuation of said shiftable member.

3. A clutch mechanism comprising a single shaft, two longitudinal abutments fast on said shaft, rotatable members mounted upon said shaft and provided with interlocking driving-inclines on the opposing ends thereof, said inclines when interlocking adapted to cause the rotation of said members in unison, one of said members rotatable with said shaft and the other of said members rotatable with and longitudinally movable upon said shaft, means interposed between one of said abutments and said longitudinally-movable member for shifting the latter, causing thereby the interlocking of the inclines, and a longitudinally-movable device adapted to operate the said means.

4. In a clutch mechanism, the combination of a pair of rotatable members having their opposing ends provided with interlocking driving-inclines, one of said members being longitudinally shiftable, of a coupling device for said members, said device comprising a sleeve, means carried thereby and adapted to engage said shiftable member for actuating it, causing thereby the interlocking of the inclines and the rotating of said members in unison, a lever mechanism for shifting said means to and from operative position, and a longitudinally-movable means engaging said lever mechanism for operating it.

5. A clutch mechanism comprising a single shaft, a pair of abutments fixed thereto, a sleeve rotatably mounted upon said shaft, arranged in close proximity to one of said abutments and provided with an interlocking driving-incline, a longitudinally-movable collar mounted upon said shaft, rotatable with the shaft, arranged adjacent to said sleeve and provided on that face opposing the sleeve with an interlocking driving-incline and on its other face with recesses, said driving-inclines adapted when said collar is shifted in one direction to interlock, causing thereby the rotation of said collar, sleeve and shaft in unison, means engaging in said recesses and adapted when operated in one direction to shift said collar toward said sleeve, causing thereby the interlocking of the inclines, a lever mechanism for operating said means in opposite directions, supporting means for said lever mechanism and means for operating said lever mechanism.

6. A clutch mechanism comprising a single shaft, a pair of abutments fixed thereto, a sleeve rotatably mounted upon said shaft, arranged in close proximity to one of said abutments and provided with an interlocking driving-incline, a longitudinally-movable collar mounted upon said shaft, rotatable with the shaft, arranged adjacent to said sleeve and provided on that face opposing the sleeve with an interlocking driving-incline and on its other face with recesses, said driving-inclines adapted when said collar is shifted in one direction to interlock, causing thereby the rotation of said collar, sleeve and shaft in unison, blocks engaging in said recesses and adapted when operated in one direction to shift the said collar toward the sleeve, causing thereby the interlocking of the inclines, levers pivoted to said blocks, spring elements bearing against the point of connection between the levers and blocks, supporting means for said levers and means for operating said levers.

7. A clutch mechanism comprising a single shaft, a pair of abutments fixed thereto, a sleeve rotatably mounted upon said shaft, arranged in close proximity to one of said abutments and provided with an interlocking driving-incline, a longitudinally-movable collar mounted upon said shaft, rotatable with the shaft, arranged adjacent to said sleeve and provided on that face opposing the sleeve with an interlocking driving-incline and on its other face with recesses, said driving-inclines adapted when said collar is shifted in one direction to interlock, causing thereby the rotation of said collar, sleeve and shaft in unison, blocks engaging in said recesses and adapted when operated in one direction to shift the said collar toward the sleeve, causing thereby the interlocking of the inclines, levers pivoted to said blocks, spring elements bearing against the point of connection between the levers and blocks, levers for actuating the first-mentioned levers, supporting means for said levers and means for operating the levers which actuate the first-mentioned levers.

8. In a clutch mechanism, the combination with a pair of rotatable members provided with interlocking driving-inclines, a coupling device for said members, said device consisting of a sleeve, means carried thereby and engaging in said shiftable member for actuating it, causing thereby the interlocking of said inclines and the rotating of the said members in unison, a lever mechanism for operating said means, a shiftable collar having a cam-lead adapted to engage said lever mechanism, thereby actuating it, and a frame for shifting the said collar.

In testimony whereof I have hereunto set my hand in presence of two subscribing witnesses.

JOSEPH EVANS.

Witnesses:
 GEO. FLUERY,
 HARRY DAVIS.